(12) United States Patent
Kocin et al.

(10) Patent No.: US 6,721,559 B1
(45) Date of Patent: Apr. 13, 2004

(54) INTEGRATED COMMUNICATIONS MANAGEMENT UNIT AND VERY HIGH FREQUENCY DATA RADIO

(75) Inventors: Michael J. Kocin, Poway, CA (US); Michael E. Campbell, San Diego, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/515,219

(22) Filed: Feb. 29, 2000

(51) Int. Cl.[7] .................................................. H04Q 7/20
(52) U.S. Cl. ..................... 455/431; 455/73; 455/550; 340/945
(58) Field of Search ............................. 455/431, 550.1, 455/73; 340/945

(56) References Cited

U.S. PATENT DOCUMENTS

| 4,642,775 | A | * | 2/1987 | Cline et al. ................. 701/200 |
|---|---|---|---|---|
| 4,675,675 | A | * | 6/1987 | Corwin et al. ............... 340/945 |
| 5,809,402 | A | * | 9/1998 | Lemme ........................ 455/73 |
| 5,969,670 | A | * | 10/1999 | Kalafus et al. ........ 342/357.02 |
| 5,973,722 | A | * | 10/1999 | Wakai et al. .................. 725/76 |
| 6,072,994 | A | * | 6/2000 | Phillips et al. ................. 455/84 |
| 6,271,768 | B1 | * | 8/2001 | Frazier et al. ............... 340/961 |
| 6,278,404 | B1 | * | 8/2001 | Niles ........................... 342/359 |
| 6,314,366 | B1 | * | 11/2001 | Farmakis et al. ........... 701/201 |

* cited by examiner

Primary Examiner—Vivian Chin
Assistant Examiner—Lewis G. West
(74) Attorney, Agent, or Firm—John A. Miller; Warn, Burgess & Hoffmann, P.C.

(57) ABSTRACT

A system for air-ground (120) and air-air (122) communications wherein a VHF data radio (204) is coupled to a high-speed bus (304). The VHF data radio complies with the ARINC 716/750 standard and is accessible via the bus using a programmable interface (306). A communications management unit (208) can also be coupled to the high-speed bus, which communicates with the VHF data radio via the bus according to the programmable interface.

20 Claims, 5 Drawing Sheets

INTEGRATED COMMUNICATIONS MANAGEMENT UNIT AND VERY HIGH FREQUENCY DATA RADIO

BACKGROUND OF THE INVENTION

1. Field of the Invention

The present invention relates generally to avionics, and more particularly an integrated communications management unit and very high frequency data radio.

2. Related Art

The growing volume of air traffic worldwide is forcing air traffic control systems to become ever more sophisticated. For example, a large effort is underway to allow for "Free Flight." Free Flight is an innovative concept designed to enhance the safety and efficiency of the National Airspace System (NAS). The concept moves the NAS from a centralized command-and-control system between pilots and air traffic controllers to a distributed system that allows pilots, whenever practical, to choose their own route and file a flight plan that follows the most efficient and economical route. The emerging world of free flight promises operators tremendous benefits in both time and cost savings.

Any such advance in air traffic control will be dependent upon a high volume of information flowing between air traffic controllers and aircraft, and aircraft to aircraft. Timely and accurate information exchange is critical to the airlines operation. An efficient communication link is therefore of critical importance to future air traffic communications and management. With the rapid expansion of airborne data link requirements, the existing communications network is being stretched beyond capacity.

The Aircraft Communication Addressing and Reporting System (ACARS) VHF data link was established in 1978. Many airlines depend on the ACARS data link for efficient, cost-effective operations. Though ACARS has evolved significantly over the years to cope with additional requirements, its limits are being reached. In the future, the data link environment is expected to evolve toward the Aeronautical Telecommunications Network (ATN).

The avionics systems within the aircraft must be able to keep pace with this increased flow of information. For example, the on-board radios will be required to handle the increased digital message traffic as well as voice communications. The design of avionics systems are in some ways constrained by industry-wide standards, such as those standards promulgated by Aeronautical Radio, Inc. (ARINC). ARINC is the technical, publishing and administrative support arm for the Airlines Electronic Engineering Committee (AEEC). The AEEC was formed in 1949 and is considered to be the leading international organization in the standardization of air transport avionics equipment and telecommunication systems. ARINC standards define the design and implementation of everything from testing requirements to navigational systems to in-flight entertainment.

Different ARINC standards address various aspects of the air-ground data link and the radios on-board the aircraft. ARINC 716/750 specifies the form, fit and function for a Very High Frequency (VHF) data radio capable of VHF voice and data communications. VHF refers to the frequency band between 30 MHz and 88 MHz, and 118 MHz and 137 MHz, which is used for line of sight commercial/civilian aeronautical applications.

The communications management unit refers to avionics equipment for managing the communications element of Communications, Navigation and Surveillance/Air Traffic Management (CNS/ATM) on-board the aircraft, including selection of the means of air-ground communications in a particular environment. ARINC 758 specifies a communications management unit which operates as a bridge/router to transfer data link messages over satellite, VHF, HF, and SATCOM data link mobile air/ground communications networks.

Currently, the VHF data radio and communications management unit are housed in separate enclosures within the aircraft. These units communicate with one another over a standard bus interface. Generally, three specifications defined the characteristics of avionics buses: ARINC 419, ARINC 429, and ARINC 629. ARINC 419 is the oldest and is considered obsolete. ARINC 629 is the newest, though only the Boeing 777 currently employs this interface. The vast majority of avionics terminals employ the ARINC 429 interface.

ARINC 429 defines the standard for the transfer of digital data between avionics systems. ARINC 429, formally known as the MARK 33 Digital Information Transfer System (DITS) specification, contains three parts in the current release of the specification (ARINC 429–15). Unlike the 419 specification, ARINC 429 defines a particular bus design and is implemented widely across virtually all modern ARINC line replaceable unit (LRU) systems. The ARINC 429 specification provides the electrical, timing, and protocol requirements. The ARINC 429 is implemented as a simplex, broadcast bus, with a wiring topology that is based upon a 78 ohm, unbalanced, twisted shielded pair. According to ARINC 429, actual transmission rates may be at a low or high-speed of operation: 12.5 kHz (12.5 to 14.5 kHz) and 100 kHz (+/−1%).

Current radio systems having separate enclosures for the VHF data radio and communications management unit communicate via an ARINC 429 interface and are therefore limited to a throughput of 100 kbits per second (Kbps). These radio systems have difficulty keeping up with the volume of messages being sent over the current ACARS system, resulting in messages having to be resent when they are dropped. Future ATM systems will only demand higher throughputs. The architecture of current radio systems, given their reliance on the low-throughput ARINC 429 interface, are not easily adaptable to satisfy the communications needs of future ATM systems.

A need therefore exists for an improved avionics communication system having a high throughput and adaptable to the demands of future ATM systems.

SUMMARY OF THE INVENTION

Briefly stated, the present invention is directed to a system for air-ground and air-air communications wherein a VHF data radio is coupled to a high-speed bus. The VHF data radio complies with the ARINC 716/750 standard and is accessible via the bus using a programmable interface. A communications management unit can also be coupled to the high-speed bus, which communicates with the VHF data radio via the bus according to the programmable interface.

Using a high-speed bus to access the VHF data radio as compared to using an ARINC 429 results in more efficient use of the airborne network because incoming messages can be processed faster with fewer errors, fewer messages are dropped, better error checking is possible, and messages may be routed to displays and intercoms more efficiently.

Another advantage of the current invention is that a programmable interface is used within the VHF data radio for communications over the high-speed bus. The programmable interface can be updated by loading new software as message protocols and formats evolve over time, without requiring any change in hardware.

An additional advantage of the current invention is that the communications management unit and VHF data radio can be housed within one enclosure. This reduces system cost, as well as space, weight and power requirements. Further, processing functions of the communications management unit (CMU) and the VHF data radio may be incorporated within a single card that can be accessed via the high-speed bus. Also, multiple VHF data radios may be housed with the CMU.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

Overview of the Present Invention

Figure 1:
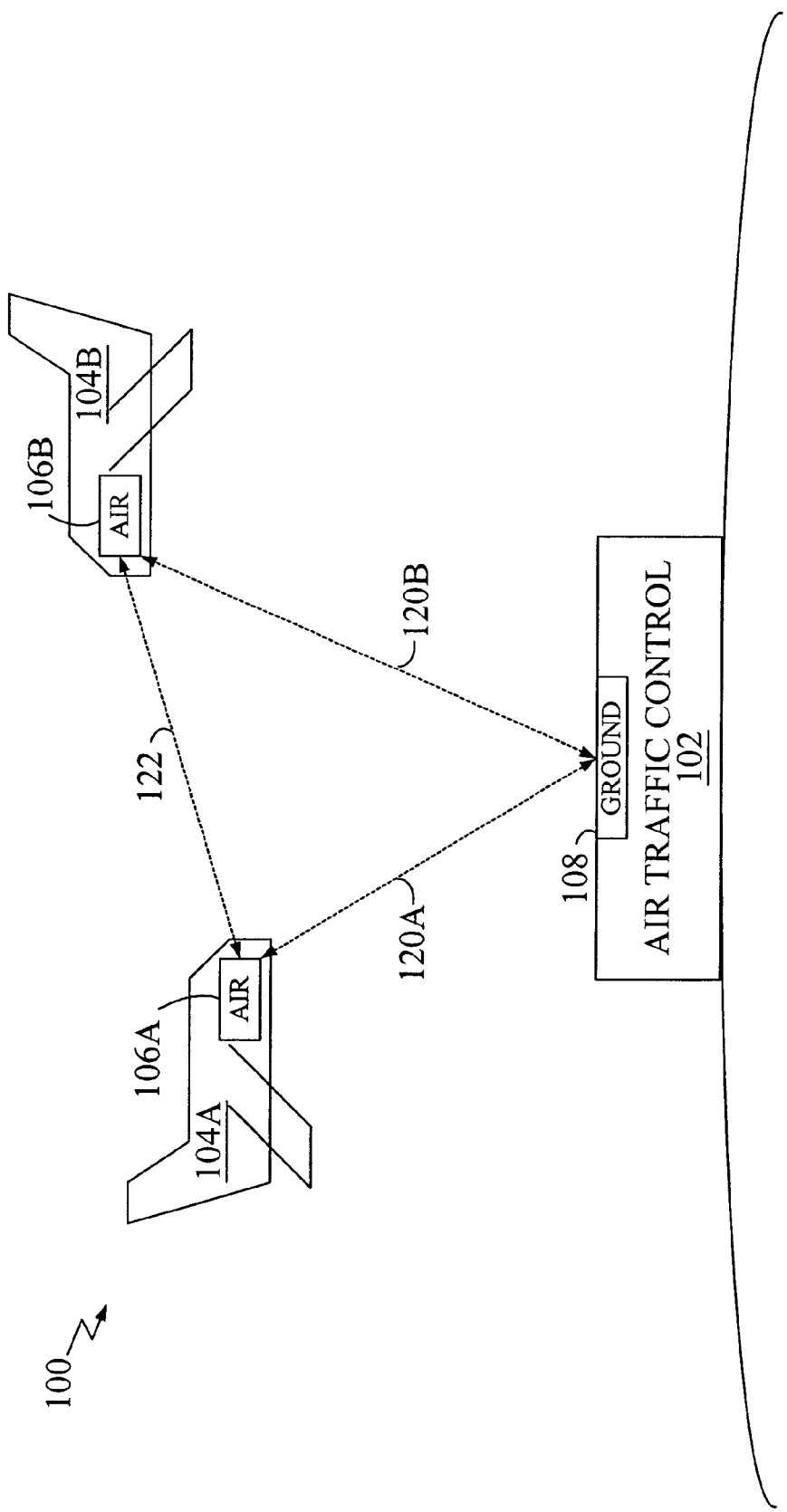
FIG. 1 depicts an example air traffic control environment within which the present invention operations, including airborne and ground components.

Briefly stated, the present invention is directed to a system for air-ground and air-air communications wherein a VHF data radio (VDR) is coupled to a high-speed bus. The VDR complies with the ARINC 716/750 standard and is accessible via the high-speed bus using a programmable interface. A communications management unit (CMU) can also be coupled to the high-speed bus, which communicates with the VDR via the bus according to the programmable interface. FIG. 1 depicts an air traffic control environment 100 within which the present invention operates. An air traffic control station 102 on the ground communicates with one or more aircraft 104 via an air-ground communication link 120. (For purposes of this description, elements will utilize a plain numeral [e.g., 104] when referring to the element generally, and will include an alphabetic qualifier [e.g., A, B] when referring to specific parts of the element.) Aircraft 104 can represent any aircraft, whether commercial, military, or private utilizing the commercial/civilian VHF Band. Similarly, air traffic control 102 can represent any entity on the ground attempting to direct the movement of aircraft 104. For the example environment shown in FIG. 1, two aircraft (104A and 104B) communicate with air traffic control 102 via air-ground communication links 120A and 120B, respectively. Also, aircraft 104A and 104B communicate with each other via air-air communication link 122.

A system according to the present invention for air-ground and air-air communications can be located within air traffic control 102 and/or within aircraft 104. As shown in FIG. 1, air traffic control 102 can include a ground system 108 for establishing air-ground communication links 120 with aircraft 104. Similarly, aircraft 104 can include an airborne system 106 for establishing air-ground communication links 120 with air traffic control 102 or air-air communication links 122 with other aircraft 104. Though the principles described herein apply to both airborne and ground systems, the implementation of these systems can vary. For example, factors such as space and weight requirements are less important for ground system 108 than for airborne system 106, which can result in different designs for the systems though their operation is based on the same principles as described herein.

Figure 2:
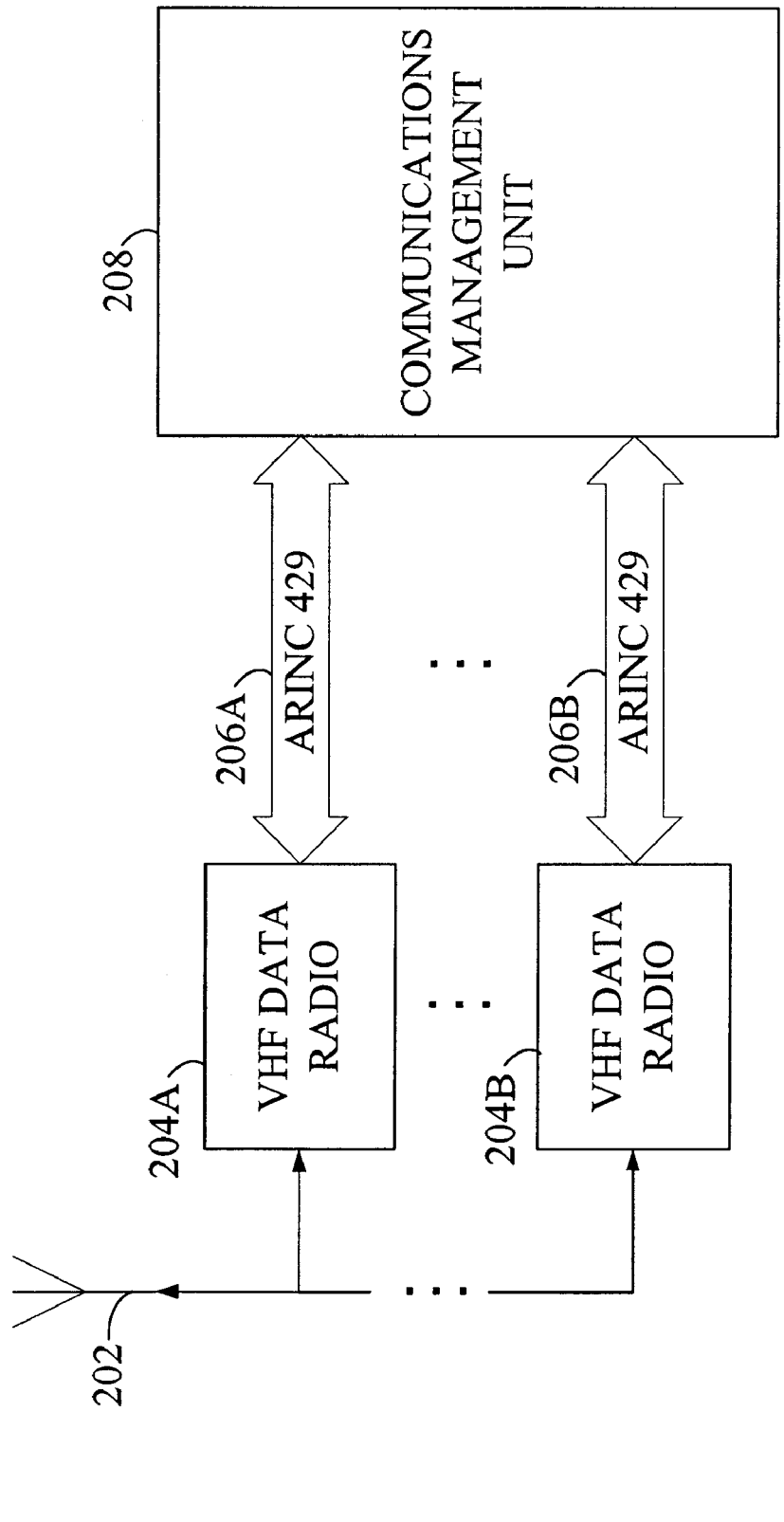
FIG. 2 depicts a prior art configuration wherein one or more VHF data radios and a communications management unit communicate according to the ARINC 429 protocol and are housed in separate enclosures.

FIG. 2 depicts an example prior art communication system 200, typical of conventional systems in use today. System 200 can represent a prior art ground system 108, or a prior art airborne system 106. System 200 includes an antenna aperture 202, one or more VDRs 204 which communicate with a communications management unit 208 over a bus 206 using the ARINC 429 protocol. VHF data radios 204 receive a radio frequency (RF) signal from antenna aperture 202. Where system 200 represents a ground system, the RF signal received via antenna aperture 202 may originate from any aircraft 104 within communication range of air traffic control 102. Where system 200 represents an airborne system, the RF signal received via antenna aperture 202 may originate from another aircraft 104 or from air traffic control 102. Antenna aperture 202 can represent a single antenna aperture, or multiple antenna apertures that can be multiplexed between one or more VDRs 204.

According to prior art system 200, each VDR 204 communicates with CMU 208 via bus 206 according to an ARINC 429 protocol. The ARINC 429 protocol limits the performance of system 200. First, the performance of VDR 204 is limited by the throughput of ARINC 429, which is 100 Kbps. Messages received via antenna aperture 202 are sometimes dropped by VDR 204 because of this limited throughput, requiring that the messages be re-sent or that duplicate messages be sent with each transmission. Furthermore, because all messages sent from VDR 204 to any subsystem within aircraft 104 or air traffic control 102 (depending upon whether system 200 is airborne or ground based) must travel through the ARINC 429 bus 206, the routing of messages to displays and intercoms is inefficient.

Second, upgrades made to bus 206 may require corresponding hardware modifications to VDR 204 and CMU 208. For example, if in the future the ARINC 429 protocol is replaced by another, more advanced protocol, then modifications to the hardware interfaces within VDR 204 and CMU 208 may be required.

Third, VDR 204 and CMU 208 are each housed within their own enclosures. Each additional enclosure consumes additional space, weight, increases cost, and potentially increases power requirements, as well as, increased cost of spares.

Integrated Communications Management Unit

Figure 3:
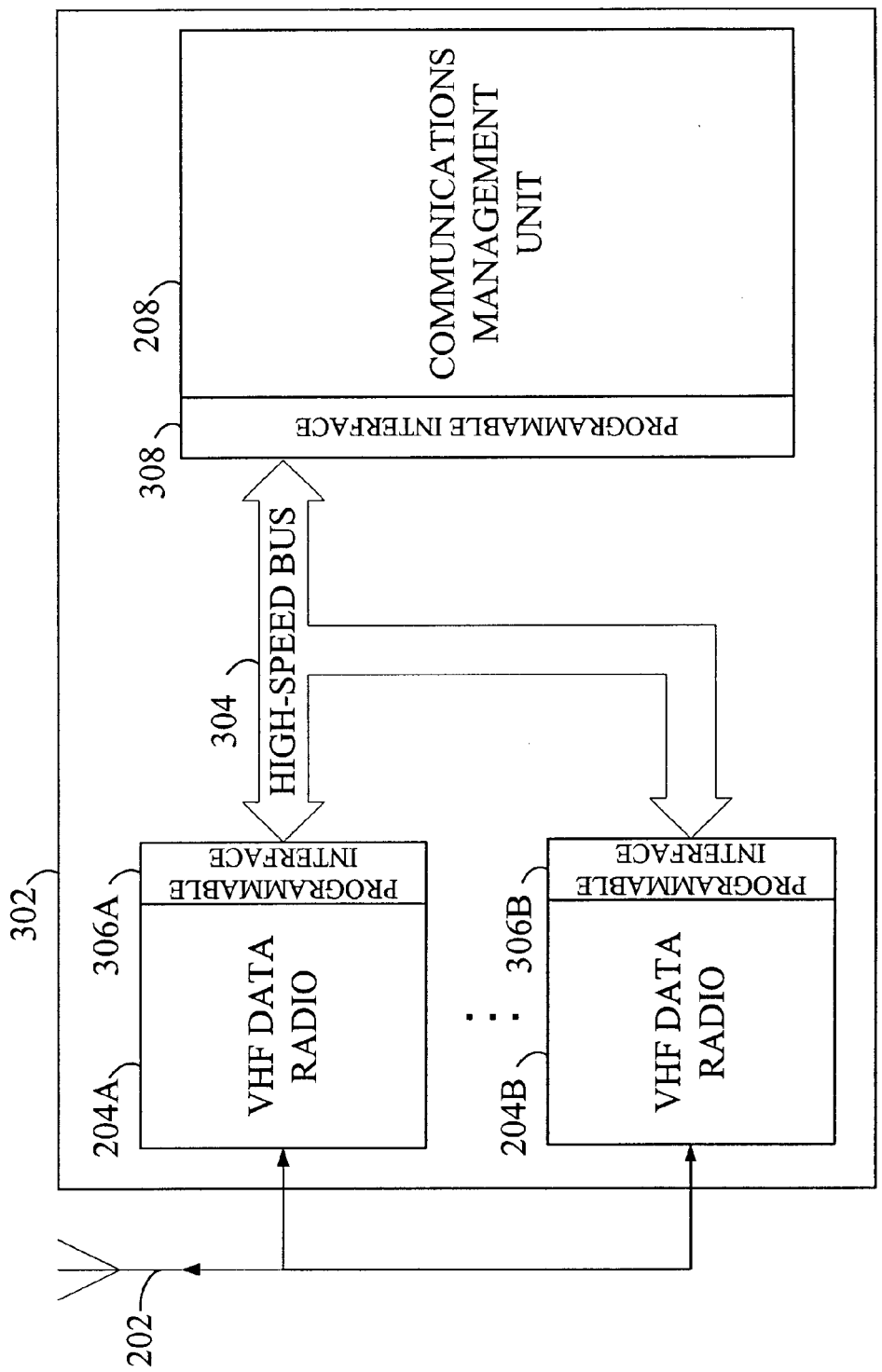
FIG. 3 depicts a communications system according to the present invention, wherein the communications management unit and one or more VHF data radios are housed within a single enclosure, and communicate via a high-speed bus.

FIG. 3 depicts an integrated system 302 according to the present invention wherein one or more VDRs 204 communicate with CMU 208 via an internal high-speed bus 304. VDR 204 utilizes a programmable interface 306 to communicate via bus 304. Similarly, CMU 208 utilizes a programmable interface 308 to communicate via bus 304. As with prior art system 200, integrated system 302 can represent a ground system 108 for establishing air-ground communication links 120 with aircraft 104, or an airborne system 106 for establishing air-ground communication links 120 with air traffic control 102 or air-air communication links 122 with other aircraft 104.

VDR 204 can represent any VHF data radio that at least complies with the ARINC 716/750 standards. According to an example embodiment of the present invention, VDR 204 supports at least modes 0 (standard voice) and A (temporary mode that allows transmitting digital data over an analog radio). According to another example embodiment, VDR 204 may also support future modes 2, 3, 4, and 5, once these modes are fully defined. However, VDR 204 can support fewer modes, or more modes, depending upon the requirements of the particular air traffic environment. An example implementation of VDR 204 in greater detail below.

Programmable interface 306 represents the various message formats and protocols that VDR 204 adheres to when communicating with CMU 208, and link media access to communicate with other subsystems within air traffic control 102 or other aircraft 104. According to the present invention, programmable interface 306 is defined in software within VDR 204, and may be updated as needed by loading new software into VDR 204. Similarly, programmable interface 308 represents the various message formats and protocols that CMU 208 adheres to when communicating with VDRs 204. Programmable interface 308 is defined in software within CMU 208, and may be updated as needed by loading new software into CMU 208.

Bus 304 represents any high-speed bus capable of transmitting digital signals from one device to another. According to an example embodiment of the present invention, bus 304 can represent a PCI bus. By using a PCI bus, the throughput of message traffic between VDR 204 and CMU 208 is greatly increased because of the 25 MHz transfer rate of the PCI bus. Using high-speed bus 304 rather than an ARINC 429 results in more efficient use of the airborne network because incoming messages can be processed faster with fewer errors, fewer messages are dropped, better error checking is possible, and messages may be routed to displays and intercoms more efficiently.

CMU 208 represents the avionics equipment for managing communications on board aircraft 104 or within air traffic control 102. CMU 208 acts as a router for messages received by VDR 204 via antenna aperture 202, routing each message to its intended destination. According to an example embodiment of the present invention, CMU 208 complies with the ARINC 758 standard.

As shown in FIG. 3, integrated system 302 houses VDR 204, bus 304, and CMU 208 within a single enclosure that operates as a single LRU. As compared to the prior art system depicted in FIG. 2, several enclosures can be reduced to a single enclosure by integrating the one or more VDRs 204 and CMU 208 in a single enclosure. This results in cost-saving, as well as reductions in space, weight, and power requirements.

Figure 4:
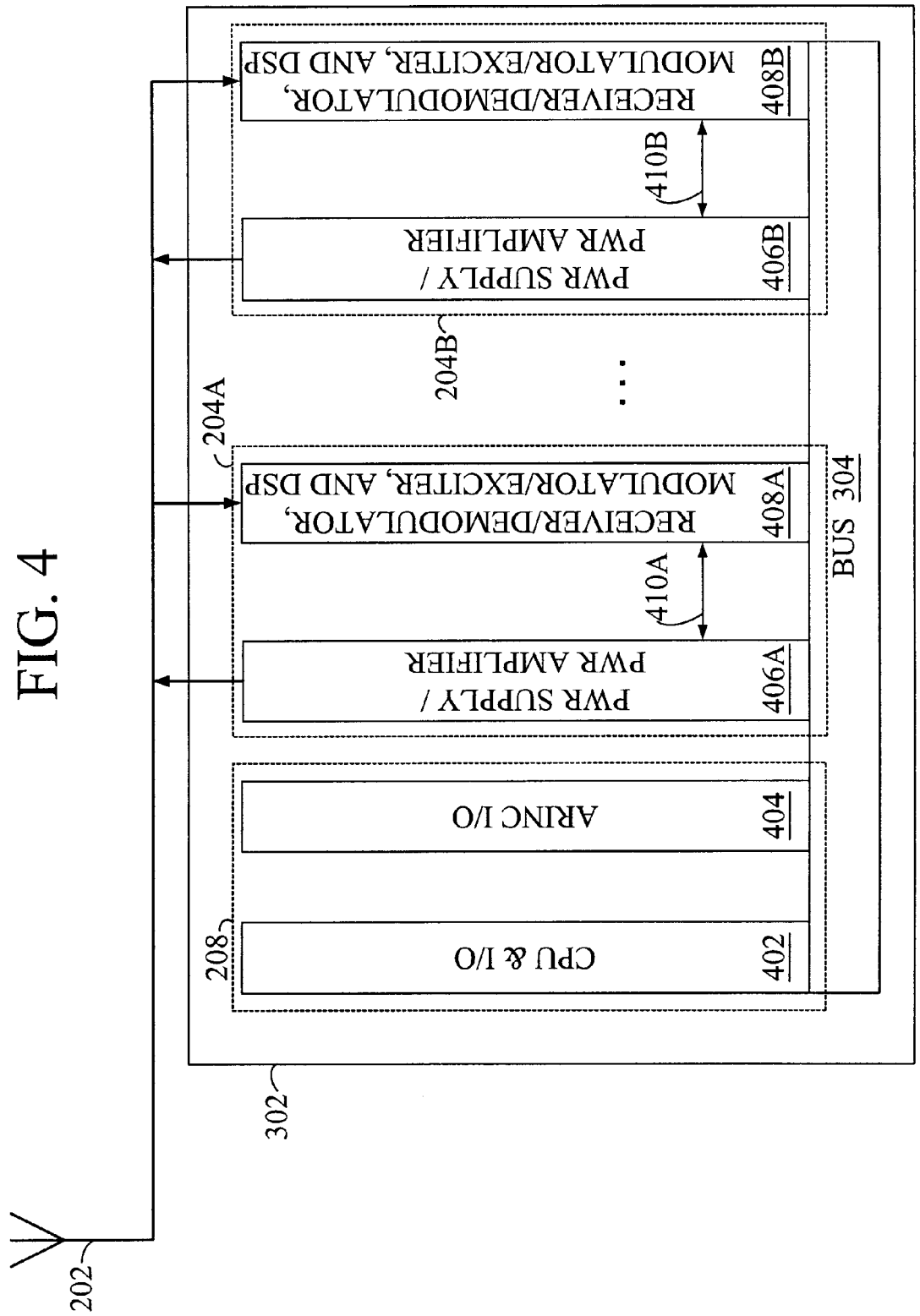
FIG. 4 depicts an example embodiment of the integrated enclosure, including the communications management unit and one or more VHF data radios communicate via a high-speed bus.

FIG. 4 depicts an example implementation of integrated system 302 according to an example embodiment of the present invention. Each VDR 204 includes a power supply/power amplifiers (PS/PA) card 406, and a receiver/demodulator, modulator/exciter, and digital signal processing (DSP) card 408, where both are coupled to high-speed bus 304, and coupled to each other by a line 410. CMU 208 includes a central processing unit (CPU) and input/output (I/O) card 402 and a ARINC I/O card 404, where both are also coupled to high-speed bus 304.

CPU and I/O card 402 represents the hardware and software that controls the CMU functions described herein. According to an example embodiment of the present invention, CPU and I/O card 402 manages those CMU functions described in the ARINC 758 standard. ARINC I/O card 404 represents the hardware and software that formats messages and adheres to protocols as defined by the ARINC 429 standard for communicating with other subsystems within aircraft 104 or air traffic control 102.

Receiver/demodulator, modulator/exciter, and DSP card 408 represents the hardware and software that receives RF input from antenna aperture 202, and performs the necessary operations to extract messages from the RF input. According to an example embodiment of the present invention, card 408 includes amplifiers, filters, mixers, and digital signal processing (DSP) hardware, where all the hardware included within card 408 is designed to have low power requirements. PS/PA card 406 represents the power supplies and power amplifiers necessary for transmitting messages via antenna aperture 202. PS/PA card 406 is employed for two-way communications with other aircraft 104 and air traffic control 102. Messages to be transmitted are passed from receiver/demodulator, modulator/exciter, and DSP card 408 to PS/PA card 406 via line 410, for power amplification before being sent to antenna aperture 202.

According to another example embodiment of the present invention, the functions described herein with respect to CMU 208 can be implemented within receiver/demodulator, modulator/exciter, and DSP card 408 (or within each card 408 if two or more VDRs 204 are present), thereby eliminating the need for cards 402 and 404. According to this example embodiment, the combined functionality can be implemented using a single high-throughput processor or multiple less-expensive processor on a single card.

Figure 5:
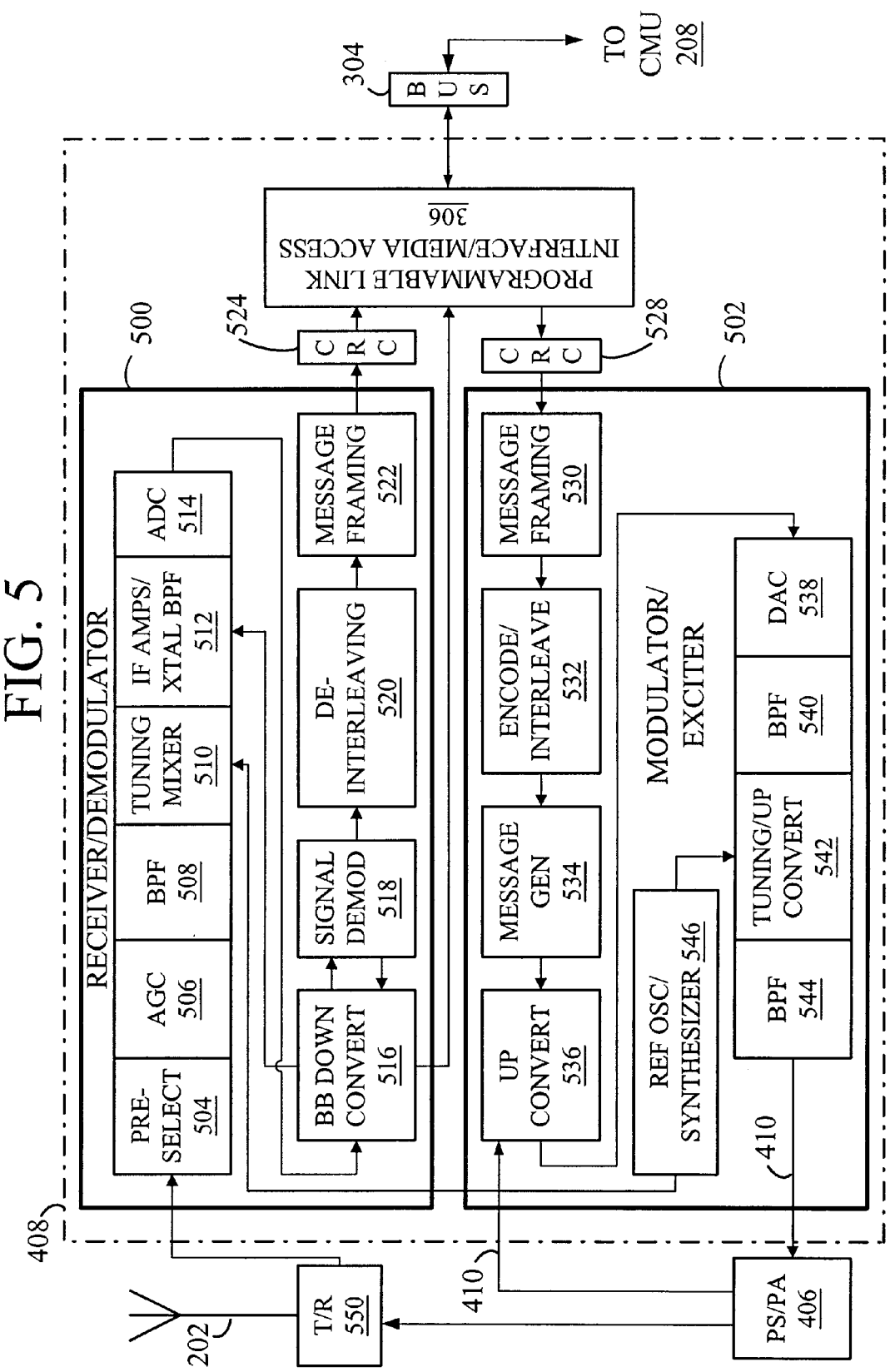
FIG. 5 depicts an example embodiment of the receiver/demodulator, modulator/exciter, and digital signal processing card in greater detail according to the present invention.

FIG. 5 depicts receiver/demodulator, modulator/exciter, and DSP card 408 in greater detail according to an example embodiment of the present invention. Card 408 includes a receiver/demodulator section 500, a modulator/exciter section 502, cyclic redundancy check (CRC) hardware 524 and 528, and programmable interface 306. Antenna aperture 202 is coupled to a transmit/receive (T/R) switch 550, which protects receiver/demodulator section 500 from high power output transmissions. When transmission is completed, T/R switch 550 is placed in the "receive" position to allow antenna aperture 202 and receiver/demodulator section 500 to listen for incoming messages.

When T/R switch 550 is in the receive position, the input RF signal enters receiver/demodulator section 500 at a pre-selector 504. Pre-selector 504 establishes the noise floor for VDR 204, and sets the appropriate filters within receiver/demodulator section 500 to the VHF band to allow the desired signals to pass through. An automatic gain control (AGC) attenuator 506 maintains the received RF signal within a specified dynamic range. AGC 506 protects receiver/demodulator section 500 circuits from damage due to saturation.

Band pass filter (BPF) 508 eliminates out of band signals from the input RF signal, allowing only VHF signals to pass to a tuning mixer 510. Tuning mixer 510 down-converts the VHF signal to an intermediate frequency (IF) for further processing. Tuning mixer 510 according to an example embodiment of the present invention down-converts a VHF channel set by the pilot (not shown) to an IF of 21.4 MHz.

Cascaded IF amplifiers and crystal BPF 512 eliminates noise and harmonics due to the mixing circuit and local oscillator. Cascaded IF amplifiers and crystal BPF 512 maintains the signal level, keeping the receiver/demodulator performing at its full dynamic range. An analog-to-digital converter (ADC) 514 transforms the analog IF signal to a digital bit stream. ADC 514 according to an example embodiment of the present invention represents a wideband, 14-bit ADC that provides high resolution of sampled data for both voice and data.

The digital IF bit stream output by ADC 514 is then passed to a baseband down-converter 516, which converts the digital IF bit stream to baseband (0 Hz carrier, data only) while reducing the number (decimation) of samples to allow processing of the data to be at the optimum DSP device speed. Baseband down-converter 516 provides feedback to cascaded IF amplifiers and crystal BPF 512, and indicates the transmission format of received messages to programmable interface 306.

A signal demodulator 518 converts the baseband data to raw bits, i.e., 1's and 0's, in a predetermined format with identifying message header, synchronization and correction for Doppler effects (due to the movement of aircraft 104). Deinterleaver 520 performs additional processing to remove the effects of transmission errors by breaking up larger error blocks into individual bits or smaller blocks capable of being error processed by the CR 524. Message framing function 522 sets the data in the correct format for final processing into voice or data. Message framing function 522 reformats message headers, data stream and unique coding to establish message boundaries. CRC 524 performs a final check for overall parity and synchronization errors or timing condition problems.

Programmable interface 306, as described above, represents a module that enforces message formats and protocols. Programmable interface 306 therefore formats messages received from antenna aperture 202 and sends them over bus 304 according to the appropriate protocol. Programmable interface 306 sets the basic rules for transmission/reception for multiple access networks. Programmable interface 306 performs mode setting/switching and determines transfer speed, routing of final message and carrier format. A message is formed based on the initial protocol type used for media access (e.g., Carrier Sense Multiple Access (CSMA), Time Division Multiple Access (TDMA)) and reconstructed into messages in their individual original formats.

According to an example embodiment of the present invention, functional modules 516 through 524 and programmable interface 306 are implemented using DSP hardware programmed to perform the described functions. According to this example embodiment, the DSP hardware is implemented as a PowerPC, such as is used in Apple Macintosh computers, though many other choices for DSP hardware are available. According to a second example embodiment, these functional modules can be implemented using custom hardware designed to perform the described functions.

As shown in FIG. 5, messages are output by programmable interface 306 to CMU 208 via high-speed bus 304. CMU 208 then routes the message to the appropriate destination subsystem within aircraft 104 or air traffic control 102.

Messages received by receiver/demodulator, modulator/exciter, and DSP card 408 over bus 304 proceed through modulator/exciter section 502 before being transmitted over antenna aperture 202. Programmable interface 306 receives messages from CMU 208 according to the current programmed message format and protocol, and sends the messages on to CRC 528 which generates an overall parity to check for synchronization errors or timing condition problems.

A message framing module 530 sets transmit data in the correct format for initial processing into a message on an RF carrier. Message framing module 530 also establishes message frame boundaries, message headers, data stream and unique coding. An encoding/interleaving module 532 formats the message based on the initial protocol type (e.g., CSMA, TDMA), controlled by programmable interface 306 to compress messages into a multiple message transmission format. Additional processing adds error correction and detection check bits and changes the order of transmission of the message bits to remove the effects of transmission errors which is performed by encoding/interleaving module 532.

A message generator 534 converts the baseband data, i.e., raw 1's and 0's, into a predetermined baseband format with identifying message header, data, and synchronization to prepare for transmission. An up-converter 536 creates the proper modulation for the IF sub-carrier and impresses (modulates) the digital baseband message with the carrier. Up-converter 536 up-converts the digital baseband message to digital IF and applies emissions control of the output waveform to reduce interference with adjacent channels based on feedback from PS/PA card 406.

The output of up-converter 536 is received by a digital-to-analog converter (DAC) 538, which creates an analog signal from the digital IF stream. A BPF 540 reduces harmonics and noise outside of the desired modulated signal spectrum. A tuning/up-convert module 542 converts the analog IF to the final desired RF frequency with specific channel tuning within the band. Another BPF 544 eliminates harmonics, noise and spur frequencies from the up-conversion process.

A reference oscillator within the synthesizer 546 provides a reference signal to tuning mixer 510 as well as to tuning/up convert module 542.

As shown in FIG. 5, the output of modulator/exciter section 502 is received by the VHF power amplifier within PS/PA card 406 via line 410. Transmitted messages are then amplified and broadcast over antenna aperture 202 with T/R switch 550 set to the transmit position. As also shown in FIG. 5, PS/PA card 406 also provides feedback of signal power spectrums to up-converter 536 to assist in the reduction of undesirable emissions.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

While the invention has been particularly shown and described with reference to preferred embodiments thereof, it will be understood by those skilled in the art that various changes in form and details may be made therein without departing from the spirit and scope of the invention.

What is claimed is:

1. A system for air-ground and air-air communications, comprising:
    a high-speed bus, said high-speed bus transmitting data signals at a speed greater than data signals are transmitted by an ARINC 429 protocol; and
    a VHF data radio (VDR), coupled to said high-speed bus, wherein said VDR complies with the Aeronautical Radio, Inc. (ARINC) 716/750 standard and is accessible via said high-speed bus using a programmable interface.

2. The system of claim 1, further comprising a communications management unit (CMU) coupled to said high-speed bus.

3. The system of claim 1, wherein said high-speed bus comprises a PCI bus.

4. The system of claim 2, wherein said CMU complies with the ARINC 758 standard.

5. The system of claim 2, wherein said VDR and said CMU are housed with a single enclosure.

6. The system of claim 1, wherein said programmable interface comprises one or more message formats and one or more message protocols.

7. The system of claim 1, further comprising an antenna aperture coupled to said VDR.

8. The system of claim 2, wherein said CMU comprises:
    a central processing unit (CPU) and input/output (I/O) card coupled to said high-speed bus; and
    an ARINC I/O card coupled to said high-speed bus.

9. The system of claim 7, wherein said VDR comprises:
    a power supply/power amplifier (PS/PA) card coupled to said high-speed bus; and
    a receiver/demodulator, modulator/exciter, and digital signal processing (DSP) card coupled to said high-speed bus, to said PS/PA card, and to said antenna aperture.

10. The system of claim 1, wherein the programmable interface is defined in software within the VDR so as to allow the VDR to communicate with the high-speed bus.

11. A system for air-ground and air-air communications, comprising:
    a high-speed internal bus, said high-speed bus transmitting data signals at a speed greater than data signals are transmitted by an ARINC 429 protocol;
    a CMU coupled to said internal bus; and
    a VDR, coupled to said internal bus, wherein said VDR complies with the ARINC 716/750 standard and communicates with said CMU via said internal bus using a VDR programmable interface.

12. The system of claim 11, wherein the VDR programmable interface provides various message formats and protocols that allow the VDR to communicate with the internal bus.

13. The system of claim 11, wherein the VDR programmable interface is defined in software within the VDR so as to allow the VDR to communicate with the internal bus.

14. The system of claim 11 further comprising a CMU programmable interface that allows the CMU to communicate with the internal bus.

15. The system of claim 14, wherein the CMU programmable interface is defined in software within the CMU.

16. A system for air-ground and air-air communications, said system comprising:
    a high-speed bus;
    an antenna aperture; and
    a VHF data radio (VDR) coupled to the high-speed bus, said VDR including a power supply/power amplifier (PS/PA) card coupled to the high-speed bus and a receiver/demodulator, modulator/exciter and digital signal processing (DSP) card coupled to the high-speed bus, the PSA/PA card and the antenna aperture, wherein the VDR complies with the Aeronautical Radio, Inc. (ARINC) 716/750 standard and is accessible via the high-speed bus using a programmable interface.

17. The system of claim 16, further comprising a communications management unit (CMU) coupled to said high-speed bus.

18. The system of claim 17, wherein said CMU complies with the ARINC 758 standard.

19. The system of claim 17, wherein said CMU includes:
    a central processing unit (CPU) and input/output (I/O) card coupled to said high-speed bus; and
    an ARINC I/O card coupled to said high-speed bus.

20. The system of claim 16, wherein said high-speed bus includes a PCI bus.

* * * * *